April 17, 1962    S. J. BIELLO ETAL    3,029,835
CHECK VALVE WITH RESILIENT AUXILIARY SEAL
Filed May 17, 1960

INVENTOR.
STEPHEN J. BIELLO
HERMAN LINDEBOOM
BY
William Frederick Kernel
ATTORNEY

United States Patent Office 3,029,835
Patented Apr. 17, 1962

3,029,835
CHECK VALVE WITH RESILIENT
AUXILIARY SEAL
Stephen J. Biello, Somerset, Mass., and Herman Lindeboom, Cranston, R.I., assignors to Sealol Corporation, Warwick, R.I., a corporation of Delaware
Filed May 17, 1960, Ser. No. 29,679
5 Claims. (Cl. 137—515.5)

This invention relates to check valves and more particularly to a check valve provided with a resilient poppet auxiliary seal.

An object of the present invention is to provide a check valve with a range of operating pressures from extremely low pressures to extremely high pressures and wherein the operating efficiency of the valve (leak proofness) is materially increased.

Another object of the present invention is to provide a check valve with an auxiliary valve sealing element fixed to the poppet valve.

Still another object of the present invention is to provide a check valve with a wide range of pressure uses and which is inexpensive to manufacture and repair.

And still another object of the present invention is to provide a poppet valve with an auxiliary valve seat which increases in sealing efficiency in direct proportion to the increase in pressure of the fluid in the hydraulic system.

A further object of the present invention is to provide a poppet valve with a resilient metal disc auxiliary valve seat which operates at extremely high temperatures and extremely high pressures.

The nub of the present invention is not only a unique flexible metal auxiliary valve seat attached to the poppet head but a uniquely inexpensive manufacturers cost and an extremely simple repair procedure.

Other objects of the present invention will be pointed out in part and become apparent in part in the following specification and claims.

The present invention is an improvement over copending application Serial #735,206, filed May 14, 1958, now Patent Number 2,994,340, and assigned to the same assignee.

In the co-pending application the auxiliary sealing arrangement is provided in the gland instead of the poppet valve head as in the instant application. The co-pending application utilizes rubber or other soft resilient material which has a lower heat resistance than the metal disc employed in the instant application. The co-pending application requires more costly machine operations and is more difficult to repair when compared to the instant application.

Referring to the drawings in which similar characters of reference indicate corresponding parts in all the figures.

Figure 1:
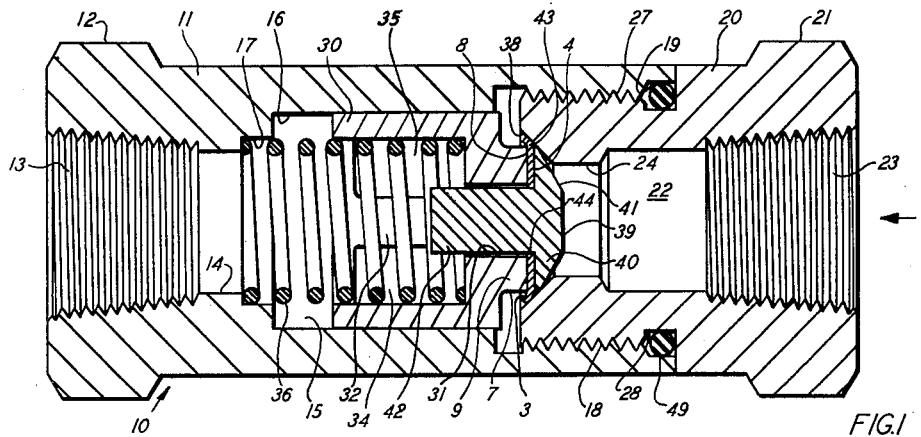
FIGURE 1 is a longitudinal cross sectional view taken along a line similar to line 1—1 of FIGURE 3 and illustrating the new and improved check valve.

Referring to FIGURE 1 wherein is illustrated the new and improved check valve with resilient poppet seal, generally indicated by reference character 10. Check valve 10 consists of a main body 11 provided externally with an hexagonal shaped shoulder 12 or other pipe wrench gripping means. Axially, body 11 is provided with a stepped bore consisting of a threaded portion 13, a flow passage 14, a chamber 15 having a bearing surface 16, a spring seat 17, a second threaded area 18 and a fluid packing seat 19.

A gland 20, hexagonal in shape on an enlarged shoulder 21, is provided axially with a stepped bore consisting of a threaded portion 23, a chamber 22 and a flow passage 24. A beveled valve seat 38 is formed at the end of flow passage 24. Gland 20 in its external diameter is provided with a threaded area 27 and a fluid packing seat 28. Gland 20 is secured to main body 11 through threaded areas 27 and 18 with a fluid packing 49 located in fluid packing seats 19 and 28.

A cage 30 is slidably mounted in chamber 15 on bearing surface 16 and is provided with a spring retaining chamber 32. A circular projection 9 having a face 8 and a circular surface 7 is integrally formed on cage 30. A poppet valve sleeve 31 is axially located in cage 30. Cage 30 is triangular in shape throughout the body area to provide a three point contact on bearing surface 16 and three open sides or ports 33, 34, 35 through which the fluid may flow.

A spring 36 or other resilient means is positioned in spring retaining chamber 32 on one end and in spring seat 17 on the other end.

A poppet valve is provided with a head 40 and a stem 42. A beveled surface 41 is formed in head 40.

The rear surface of head 40 in cooperation with stem 42 forms a shoulder 4 for purposes which will presently appear. Stem 42 is loosely mounted in sleeve 31. The combination of the cage 30, poppet valve 40 and spring 36 slidably mounted on bearing surface 16 functions as a piston.

Stem 42 is loosely mounted in poppet valve sleeve 31 to allow beveled surface 41 to center itself or axially align itself when engaging beveled valve seat 38. Stem 42 may be rigidly held in poppet valve sleeve 31 by means of a drive fit. In that event bearing surface 16 would require exact machining for exact alignment with beveled valve seat 38. This is an extremely costly and arduous manufacturing procedure.

A disc 43 having an axial orifice 44 is fabricated from extremely thin material. The material may consist of Teflon, Kel-F, neoprene, Monel metal or stainless steel. It is contemplated that a Monel metal or stainless steel sliver between two and three thousandths of an inch (.002–.003) thick will be used. All other materials including neoprene will be substantially less than one eighth of an inch thick.

When a sliver is cut from rigid material, the sliver becomes flexible. This is true of metal or plastic.

The axial orifice 44 will engage stem 42 with an extremely tight fit so that said engagement will have a fluid tight relationship at five thousand pounds per square inch fluid pressure. Face 8 will abut disc 43 and with the force of spring 36 sandwich disc between face 8 and shoulder 4 of poppet valve 40 leaving an unsupported edge 3. Disc 43 is larger in diameter than head 40. The area of disc 43 extending beyond head 40 and circular projection 9 forms a flexible sealing edge or surface 3.

Figure 4:
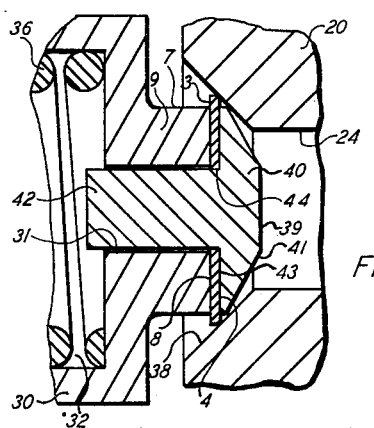
FIGURE 4 is a fragmentary cross sectional view illustrating the initial sealing engagement of the valve with the resilient valve seat when the valve is subjected to extremely low pressure.
Figure 5:
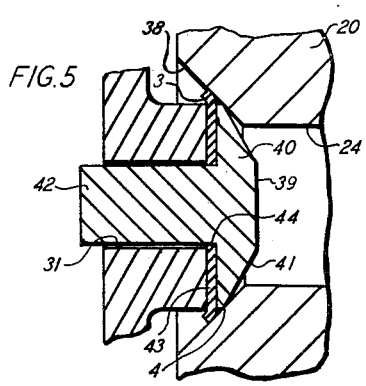
FIGURE 5 is a view similar to FIGURE 4 showing the valve and valve seat in metal to metal contact when the valve is subjected to extremely high pressure and the resilient valve seat distorts to assist the fluid sealing of the valve and valve seat.
Figure 6:
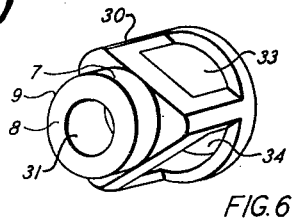
FIGURE 6 is a perspective view of the cage.

FIGURE 4 illustrates disc 43 initially engaging beveled valve seat 38.

FIGURE 1 illustrates disc 43 and beveled surface 41 engaging beveled valve seat 38 under the influence of spring 36.

Figure 2:
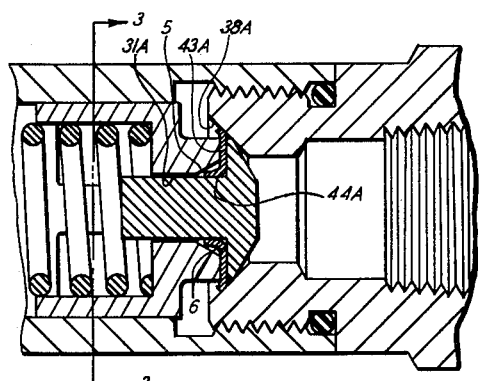
FIGURE 2 is a fragmentary cross sectional view similar to FIGURE 1 showing a modified form of construction for the resilient valve seat.
Figure 3:
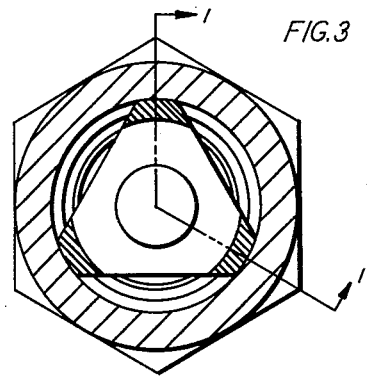
FIGURE 3 is a vertical cross sectional view taken along line 3—3 of FIGURE 2.

FIGURE 2 illustrates a modified form of disc, indicated as 43A. Instead of the axial orifice 44 engaging stem 42 as illustrated in FIGURES 1 and 4; the axial orifice 44A is created through the rolled edge of disc 43A which forms a cone or sleeve 6. Cone or sleeve 6 engages stem 42 in a fluid tight relationship. This form is particularly desirable when soft resilient material, such as neoprene, is employed as disc material. Sleeve 31A is relieved as at 5 to provide space for the rolled edge of disc 43A.

In operation spring 36 with a predetermined tension yieldingly forces cage 30, disc 43 and beveled surface 41 against beveled valve seat 38. The flow of fluid through check valve 10 is in the direction of the arrow in FIGURE 1, namely, from right to left. When check valve 10 is connected to a hydraulic system through threaded areas 13, 23; there will be back pressure in chamber 15 and elsewhere on the left side (FIGURE 1) of disc 43. The back pressure will act on sealing surface 3 of disc 43, that is the unsupported edge extending beyond circular surface 7, and thereby force sealing surface 3 against beveled valve seat 38, FIGURE 1, or 38A, FIGURE 2.

The present invention relates to check valves such as are used with pumps having a pressure which starts at zero and which attains a pressure of 7500 p.s.i.

The pressure acting on face 39 of poppet valve 40 must be sufficient to overcome the tension of spring 36 to allow the fluid to flow through check valve 10. As the pressure in the pump line drops, back pressure in chamber 15 acting on cage 30 and poppet valve 40, assisted by spring 36, will cause beveled surface 41 and disc 43 to engage beveled valve seat 38.

Should disc 43 wear replacement is quickly and easily made by unscrewing gland 20 from main body 11. Poppet valve 40 is withdrawn from sleeve 31. Disc 43 is removed from stem 42. A new disc 43 is forced upon stem 42. Stem 42 is slid into sleeve 31 and gland 20 is rescrewed into main body 11. This is an important feature of the present construction.

Having shown and described a preferred embodiment of the present invention, by way of example, it should be realized that structural changes could be made and other examples given without departing from either the spirit or scope of this invention.

What I claim is:

1. A check valve consisting of a main body provided axially with a bore having a bearing surface, a gland provided axially with a bore having a beveled valve seat, means to secure said gland to said main body in fluid tight relationship with said first and second mentioned bores in axial alignment, a cage provided with a projection and a plurality of ports, a poppet valve sleeve axially located in said projection, said cage slidably mounted on said bearing surface, a poppet valve having a head and a stem, a beveled surface in said head, said stem located in said poppet valve sleeve, a disc larger in diameter than said head secured to said head, the area of said disc extending beyond said head forming an auxiliary sealing surface, said disc fabricated from substantially rigid material, said disc having a thickness equal to a sliver, whereby said rigid material becomes flexible in the area forming said auxiliary sealing surface, resilient means located in said first mentioned bore urging said cage and poppet valve toward said gland, whereby said beveled surface and said auxiliary sealing surface yieldingly engage said beveled valve seat.

2. A check valve consisting of a main body provided axially with a stepped bore having a flow passage and a bearing surface, a gland provided axially with a stepped bore having a flow passage and a beveled valve seat, means to secure said gland to said main body in fluid tight relationship with said first and second mentioned stepped bores in axial alignment, a cage provided with ports and a projection, a poppet valve sleeve axially located in said cage and projection, said cage slidably mounted on said bearing surface, a poppet valve having a head and a stem, a beveled surface in said head, the rear surface of said head forming a shoulder in cooperation with said stem, said stem loosely mounted in said poppet valve sleeve, a disc larger in diameter than said head, the area of said disc extending beyond said head forming an auxiliary sealing surface, said disc fabricated from substantially rigid material, said disc having a thickness substantially equal to a sliver, whereby said rigid material becomes flexible, said disc secured to said stem in fluid tight relationship and abutting said shoulder, resilient means located in said first mentioned stepped bore urging the projection on said cage against said disc, thereby urging said disc against said shoulder, whereby said beveled surface and the sealing surface of said disc yieldingly engage said beveled valve seat.

3. A check valve consisting of a main body provided axially with a bore having a bearing surface, a gland provided axially with a bore having a beveled valve seat, a cage provided with a projection, a plurality of ports and an axially located poppet valve sleeve, said cage slidably mounted on said bearing surface, a poppet valve having a head and a stem, a beveled surface in said head, the rear surface of said head forming a shoulder in cooperation with said stem, said stem slidably mounted in said poppet valve sleeve, a disc larger in diameter than said head, the area of said disc extending beyond said head forming an auxiliary sealing surface, said disc fabricated from stainless steel approximately three thousandths of an inch thick whereby said stainless steel becomes flexible, a cone formed axially in said disc, said cone engaging said stem in fluid tight relationship, said disc abutting said shoulder, means to secure said gland to said main body in fluid tight relationship, resilient means housed in said first mentioned bore urging the projection on said cage against said disc, thereby urging said disc against said shoulder, whereby said beveled surface and the sealing surface of said disc yieldingly engage said beveled valve seat.

4. A check valve consisting of a main body provided axially with a stepped bore having a flow passage and a bearing surface, a gland provided axially with a stepped bore having a flow passage and a beveled valve seat, a cage having ports and provided with a circular projection having a face and an axially located poppet valve sleeve, a poppet valve having a head and a stem, a beveled surface in said head, a shoulder formed between said head and stem, said stem slidably mounted in said poppet valve sleeve, a disc larger in diameter than said head interposed between said shoulder and said face, said disc secured to said stem in a fluid tight relationship, means securing said gland to said main body, said cage constituting a piston slidably mounted on said bearing surface, resilient means located in said first mentioned stepped bore urging said cage and through said cage, said disk and the beveled surface in said head against said beveled seat.

5. A check valve consisting of a main body provided axially with a bore having a bearing surface, a gland provided axially with a bore having a beveled valve seat, a cage having ports and provided with a projection and an axially located poppet valve sleeve, said cage slidably mounted on said bearing surface, a poppet valve having a head and a stem, a beveled surface in said head, the rear surface of said head forming a shoulder in cooperation with said stem, said stem slidably mounted in said poppet valve sleeve, a disc larger in diameter than said head, the area of said disc extending beyond said head forming an auxiliary sealing surface, said disc provided in the form of a sliver of substantially rigid material, whereby said disc becomes flexible, said disc secured to said stem in a fluid tight relationship and abutting said shoulder, means to secure said gland to said main body, resilient means located in said first mentioned bore urging the projection on said cage against said disc, thereby urging said disc against said shoulder, whereby said beveled surface and the sealing surface of said disc yieldingly engage said beveled valve seat.

References Cited in the file of this patent

UNITED STATES PATENTS

| | | |
|---|---|---|
| 2,521,961 | Bacheller | Sept. 12, 1950 |
| 2,673,062 | Cornelius | Mar. 23, 1954 |
| 2,900,999 | Courtot | Aug. 25, 1959 |

FOREIGN PATENTS

| | | |
|---|---|---|
| 591,449 | France | Apr. 9, 1925 |